US008138127B2

(12) United States Patent
Pope et al.

(10) Patent No.: US 8,138,127 B2
(45) Date of Patent: Mar. 20, 2012

(54) COMPOSITIONS AND METHODS FOR TREATING A WATER BLOCKED WELL USING A NONIONIC FLUORINATED SURFACTANT

(75) Inventors: Gary A. Pope, Cedar Park, TX (US); Jimmie R. Baran, Jr., Prescott, WI (US); Vishal Bang, Houston, TX (US); John D. Skildum, North Oaks, MN (US); Mukul M. Sharma, Austin, TX (US)

(73) Assignees: Board of Regents, The University of Texas, Austin, TX (US); 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/532,674

(22) PCT Filed: Dec. 30, 2007

(86) PCT No.: PCT/US2007/089182
§ 371 (c)(1),
(2), (4) Date: Mar. 2, 2010

(87) PCT Pub. No.: WO2008/118241
PCT Pub. Date: Oct. 2, 2008

(65) Prior Publication Data
US 2010/0167964 A1 Jul. 1, 2010

Related U.S. Application Data

(60) Provisional application No. 60/896,880, filed on Mar. 23, 2007.

(51) Int. Cl.
*C09K 8/584* (2006.01)
*C09K 8/60* (2006.01)
(52) U.S. Cl. .......... 507/205; 166/305.1; 166/311; 507/224; 507/247; 507/252; 507/261
(58) Field of Classification Search ............ 507/205, 507/224, 247, 252, 261; 166/305.1, 311
See application file for complete search history.

(56) References Cited

U.S. PATENT DOCUMENTS

| | | |
|---|---|---|
| 2,732,398 A | 1/1956 | Brice et al. |
| 2,803,615 A | 8/1957 | Ahlbrecht et al. |
| 3,311,167 A | 3/1967 | O'Brien et al. |
| 3,394,758 A | 7/1968 | Terry et al. |
| 3,554,288 A | 1/1971 | Ross |
| 3,653,442 A | 4/1972 | Ross |
| 3,787,351 A | 1/1974 | Olson |
| 3,902,557 A | 9/1975 | Shaughnessy et al. |
| 4,018,689 A | 4/1977 | Thompson |
| 4,085,799 A | 4/1978 | Bousaid et al. |
| 4,329,236 A | 5/1982 | Alford et al. |
| 4,409,110 A | 10/1983 | Borchardt et al. |
| 4,432,882 A | 2/1984 | Raynolds et al. |
| 4,440,653 A | 4/1984 | Brisco et al. |
| 4,460,791 A | 7/1984 | Cooke |
| 4,557,837 A | 12/1985 | Clark et al. |
| 4,565,639 A | 1/1986 | Penny et al. |
| 4,609,043 A | 9/1986 | Cullick |
| 4,702,849 A | 10/1987 | Penny |
| 4,767,545 A | 8/1988 | Karydas et al. |
| 4,823,873 A | 4/1989 | Karydas |
| 4,921,619 A | 5/1990 | Karydas |
| 4,923,009 A | 5/1990 | Watkins |
| 4,975,468 A | 12/1990 | Yiv |
| 4,993,448 A | 2/1991 | Karydas et al. |
| 4,997,580 A | 3/1991 | Karydas et al. |
| 5,042,580 A | 8/1991 | Cullick et al. |
| 5,129,457 A | 7/1992 | Sydansk |
| 5,143,958 A | 9/1992 | Lockhart et al. |
| 5,181,568 A | 1/1993 | McKown et al. |
| 5,186,257 A | 2/1993 | Stahl et al. |
| 5,219,476 A | 6/1993 | Lockhart et al. |
| 5,247,993 A | 9/1993 | Sarem et al. |
| 5,310,882 A | 5/1994 | Blauch et al. |
| 5,338,465 A | 8/1994 | Lockhart et al. |
| 5,358,052 A | 10/1994 | Gidley |
| 5,415,229 A | 5/1995 | Sydansk |
| 5,477,924 A | 12/1995 | Pollack |
| 5,733,526 A | 3/1998 | Trevino et al. |
| 5,823,262 A | 10/1998 | Dutton |
| 5,965,659 A | 10/1999 | Kubo et al. |
| 6,113,919 A | 9/2000 | Reiss et al. |
| 6,127,430 A | 10/2000 | Baran, Jr. et al. |

(Continued)

FOREIGN PATENT DOCUMENTS

CA 2009732 8/1990

(Continued)

OTHER PUBLICATIONS

Extended European Search Report for EP 07 87 0115 dated Aug. 5, 2010.
Supplementary European Search Report for EP 07870113.3 dated Feb. 9, 2010.
Adibhatla, B., et al., "Effect of surfactants on wettability of near-wellbore regions of gas reservoirs," J Petr Sci Engr (2006), 52:227-236.
Al-Anazi et al., "Laboratory Measurements of Condensate Blocking and Treatment for Both Low and High Permeability Rocks", 2002, SPE 77546, Society of Petroleum Engineers Inc., pp. 1-9.
Al-Anazi et al., "A Successful Methanol Treatment in a Gas-Condensate Reservoir: Field Application", Mar. 2003, SPE 80901, Society of Petroleum Engineers Inc., pp. 1-9.
Al-Anazi, "Experimental Measurements of Condensate Blocking and Treatments in Low and High Permeability Cores" (Thesis), Dec. 2003, pp. 1-474.

(Continued)

*Primary Examiner* — Timothy J. Kugel
(74) *Attorney, Agent, or Firm* — Chainey P. Singleton; Chalker Flores, LLP

(57) ABSTRACT

The present invention includes a method of treating a hydrocarbon-bearing clastic formation having non-connate water by contacting the hydrocarbon-bearing clastic formation with a composition that includes a solvent and a nonionic fluorinated polymeric surfactant wherein the solvent at least partially displaces or solubilizes the water in the formation.

20 Claims, 2 Drawing Sheets

U.S. PATENT DOCUMENTS

| | | | |
|---|---|---|---|
| 6,206,102 | B1 | 3/2001 | Pusch et al. |
| 6,255,263 | B1 | 5/2001 | Collins et al. |
| 6,274,060 | B1 | 8/2001 | Sakashita et al. |
| 6,443,230 | B1 | 9/2002 | Boles et al. |
| 6,579,572 | B2 | 6/2003 | Espin et al. |
| 6,660,693 | B2 | 12/2003 | Miller et al. |
| 6,664,354 | B2 | 12/2003 | Savu et al. |
| 6,689,854 | B2 | 2/2004 | Fan et al. |
| 6,729,409 | B1 | 5/2004 | Gupta et al. |
| 6,805,198 | B2 | 10/2004 | Huang et al. |
| 6,852,781 | B2 | 2/2005 | Savu et al. |
| 6,911,417 | B2 | 6/2005 | Chan et al. |
| 6,945,327 | B2 | 9/2005 | Ely et al. |
| 6,972,274 | B1 | 12/2005 | Slikta et al. |
| 7,072,809 | B2 | 7/2006 | Egermann et al. |
| 7,199,197 | B2 | 4/2007 | Caldwell et al. |
| 7,585,817 | B2 | 9/2009 | Pope et al. |
| 7,772,162 | B2 | 8/2010 | Pope et al. |
| 7,855,167 | B2 | 12/2010 | Pope et al. |
| 2001/0016562 | A1 | 8/2001 | Muir et al. |
| 2002/0028750 | A1 | 3/2002 | Dobson et al. |
| 2003/0083448 | A1 | 5/2003 | Fan et al. |
| 2003/0092581 | A1 | 5/2003 | Crews |
| 2003/0139549 | A1 | 7/2003 | Savu |
| 2004/0186254 | A1 | 9/2004 | Fan et al. |
| 2005/0142563 | A1 | 6/2005 | Haddad et al. |
| 2005/0148491 | A1 | 7/2005 | Savu et al. |
| 2005/0245401 | A1 | 11/2005 | Chan et al. |
| 2006/0052499 | A1 | 3/2006 | Gillig et al. |
| 2007/0015669 | A1 | 1/2007 | Zhang |
| 2007/0029085 | A1* | 2/2007 | Panga et al. ............... 166/263 |
| 2007/0225176 | A1* | 9/2007 | Pope et al. ............... 507/221 |
| 2010/0137169 | A1 | 6/2010 | Pope et al. |
| 2010/0152071 | A1 | 6/2010 | Pope et al. |
| 2010/0181068 | A1 | 7/2010 | Pope et al. |
| 2010/0224361 | A1 | 9/2010 | Pope et al. |
| 2010/0270019 | A1 | 10/2010 | Pope et al. |
| 2010/0276149 | A1 | 11/2010 | Pope et al. |
| 2010/0319920 | A1 | 12/2010 | Pope et al. |

FOREIGN PATENT DOCUMENTS

| | | |
|---|---|---|
| EP | 1 999 339 | 12/2008 |
| EP | 2 054 485 | 5/2009 |
| EP | 2 132 240 A1 | 12/2009 |
| RU | 2164291 | 3/2001 |
| WO | 2005/028589 A1 | 3/2005 |
| WO | 2005/035936 A1 | 4/2005 |
| WO | 2005/100007 A2 | 10/2005 |
| WO | 2006/028608 A1 | 3/2006 |
| WO | 2007/097975 A2 | 8/2007 |
| WO | 2007/126431 A1 | 11/2007 |
| WO | 2008/024865 A2 | 2/2008 |

OTHER PUBLICATIONS

Ayyalasomayajula et al., "Phase Behavior Modeling of Hydrocarbon-Methanol-Water Mixtures by Peng-Robinson and SAFT Equations of State", Sep. 2002, SPE 77575, Society of Petroleum Engineers Inc., pp. 1-8.

Ayyalasomayajula, "Prediction of Bulk and Interfacial Thermodynamic Properties of Polar Mixtures by Statistical Associating Fluid Theory" (Thesis), May 2003, pp. 1-268.

Bang, "Phase Behavior Study of Hydrocarbon-Water-Alcohol Mixtures" (Thesis) May 2005, pp. 1-138.

Chowdhury, "Reservoir Simulation of Asphaltene Precipitation and of Gas Condensates" (Thesis), Dec. 2003, pp. 1-227.

Chowdhury et al., "A Semi-Analytical Method to Predict Well Deliverability in Gas-Condensate Reservoirs", Sep. 2004, SPE 90320, Society of Petroleum Engineers Inc., pp. 1-13.

Crema et al., "Foaming of Anhydrous Methanol for Well Stimulation", Apr. 1985, SPE 13565, Society of Petroleum Engineers Inc., 4 pages.

Du et al., "Use of Solvents to Improve the Productivity of gas Condensate Wells", Oct. 2000, SPE 62935, Society of Petroleum Engineers Inc., pp. 1-8.

Fahes et al., "Wettability Alteration to Intermediate Gas-Wetting in Gas-Condensate Reservoirs at High Temperatures", Oct. 2005, SPE 96184, Society of Petroleum Engineers Inc., pp. 1-14.

Gadde et al., "Modeling Proppant Settling in Water-Fracs", Sep. 2004, SPE 89875, Society of Petroleum Engineers Inc., pp. 1-10.

International Search Report and Written Opinion for PCT/US2007/076562 dated Sep. 29, 2008.

Kumar, "A Simulation Study of Carbon Sequestration in Deep Saline Aquifers" (Thesis), Aug. 2004, pp. 1-192.

Lee, "Phase Equilibria in Systems Containing Hydrocarbon, Water and Methanol" (Thesis), May 2003, pp. 1-92.

Li, K., et al., "Experimental Study of Wettability Alteration to Preferential Gass-Wetting in Porous Media and Its Effects," SPE Reservoir Eval and Eng (2000), 3:139-149.

Mahadevan et al., "Clean-up of Water Blocks in Low Permeability Formations", Oct. 2003, SPE 84216, Society of Petroleum Engineers Inc., pp. 1-8.

Mahadevan et al., "Evaporative Clean-up of Water-Blocks in Gas Wells", Apr. 2005, SPE 94215, Society of Petroleum Engineers Inc., pp. 1-11.

Narayanaswamy et al., "Effect of Heterogeneity on the Non-Darcy Flow Coefficient", Mar. 1998, SPE 39979, Society of Petroleum Engineers Inc., pp. 1-17.

Nasr-El-Din et al., "Surface tension of HCl-based stimulation fluids at high temperatures", Jun. 2004, Journal of Petroleum Science and Engineering, vol. 43(1-2), pp. 57-73.

Ortiz et al., "Low-pH methanol: an alternative for stimulation in water-sensitive, tight, dirty sandstones", 1986, SPE Production Engineering (0885-9221), vol. 1(3). pp. 195-202.

Parekh et al., "Cleanup of Water Blocks in Depleted Low-Permeability Reservoirs", Sep. 2004, SPE 89837, Society of Petroleum Engineers Inc., pp. 1-12.

Pope et al., "Modeling Relative Permeability Effects in Gas-Condensate Reservoirs using a New Trapping Model", Sep. 1998, SPE 49266, Society of Petroleum Engineers Inc., pp. 1-8.

Product Information: 3M™ Novec Fluorosurfactant FC-4430, Oct. 2005, 6 pages.

Product Information: 3M™ Novec Fluorosurfactant FC 4432, Oct. 2005, 6 pages.

Product Information: 3M™ Novec Fluorosurfactant FC 4434, Jan. 2005, 4 pages.

Rai, "Parametric Study of Relative Permeability Effects on Gas-Condensate core Floods and Wells" (Thesis), Dec. 2003, pp. 1-319.

Sharma, "Modeling Gas Condensate Reservoirs and Development of a New Hybrid Well Model" (Thesis), May 2003, pp. 1-231.

Sharma et al., "Slick Water and Hybrid Fracs in the Bossier: Some Lessons Learnt", Sep. 2004, SPE 89876, Society of Petroleum Engineers Inc., pp. 1-12.

Tang, G-Q., et al., "Relative Permeability Modification in Gas-Liquid Systems Through Wettability Alteration to Intermediate Gas-Wetting," Oct. 2000, SPE 62934, Society of Petroleum Engineers Inc., pp. 1-15.

U.S. Department of Energy, "Comments on the Outlook for Balancing Natural Gas Supply and Demand, EPAct Section 1818: Natural Gas Shortage Report," http://www.fossil.energy.gov/epact/Section_1818/comments.html, accessed Mar. 16, 2008.

Wu et al., "Modeling Non-Equilibrium Mass Transfer Effects for a Gas Condensate Field", Mar. 1998, SPE 39764, Society for Petroleum Engineers Inc., pp. 1-16.

European Search Report for EP 07870112 dated Jul. 1, 2011.

International Search Report for PCT/US2007/089182 dated Jul. 1, 2008.

US 6,492,477, 12/2002, Savu et al. (withdrawn)

* cited by examiner

COMPOSITIONS AND METHODS FOR TREATING A WATER BLOCKED WELL USING A NONIONIC FLUORINATED SURFACTANT

CROSS REFERENCE TO RELATED APPLICATIONS

This application is a National Stage filing under 35 U.S.C. §371 of PCT/US2007/089182, filed Dec. 30, 2007, which claims priority to U.S. Provisional Application No. 60/896,880, filed March 23, 2007, the disclosure of which is incorporated by reference in its entirety herein. This application is related to U.S. Pat. No. 7,585,817, issued Sep. 8, 2009; U.S. Pat. No. 7,772,162, issued Aug. 10, 2010; U.S. Pat. No. 7,855,169, issued Dec. 21, 2010; U.S. patent application Ser. No. 12/302,017, filed Jul. 7, 2010; U.S. patent application Ser. No. 12/532,682, filed Mar. 11, 2010; U.S. patent application Ser. No. 12/532,668, filed Mar. 2, 2010; U.S. patent application Ser. No. 12/532,689, filed Jan. 27, 2010; U.S. patent application Ser. No. 12/532,684, filed Mar. 1, 2010; U.S. patent application Ser. No. 12/532,650, filed Mar. 1, 2010; and U.S. patent application Ser. No. 12/745,405, filed Mar. 28, 2010.

BACKGROUND OF THE INVENTION

When wellbores are drilled it is common to penetrate various subterranean bearing formations to reach the hydrocarbon-bearing formation of interest. Upon completion of the wellbores, water can reach the wellbore from a variety of sources, including natural water close to the formation or from artificial fluids that have been introduced into or adjacent to the wellbore. Examples of artificial sources of water include: drilling mud and other water-based drilling-fluids and fracturing fluids. Natural sources of water that are near-wellbore include adjacent formations with quantities of water greater than the in-situ or natural water saturation levels of the formation. In-situ water saturation levels are typically nearly, if not the same, as the connate water saturation levels, although in some formations the in-situ water saturation levels may be substantially greater or less than the connate water saturation level for the formation.

Whether from natural or artificial sources, water that remains or enters a formation can greatly reduce, or completely stop, gas production from a well. Even shut-in wells can lose productivity after a short duration (including just a few days) due to water brine, flowing water, connate water, mobile water, immobile water, crossflow water, residual water, water in downhole fluids, water in concrete, water from adjacent perforated formations entering the wellbore region. Further, when formations are drilled, in addition to in-situ water, the wellbore region may be invaded with water from any of the sources of water listed.

SUMMARY OF THE INVENTION

The present invention includes compositions and methods for the treatment of hydrocarbon formations. In one aspect, the present invention may be used to treat hydrocarbon formations that have been damaged by water (i.e., at least partially water blocked). Examples of formations that may be treated using the present invention include dry gas reservoirs, wet gas reservoirs, retrograde condensate gas reservoirs, tight gas reservoirs, gas storage reservoirs and combinations thereof. Certain embodiments are advantageous for the production of gas.

The present invention may be used in either production or gas injection wells. The water may come, e.g., from an adjacent hydrocarbon-bearing formation that has water from an adjacent formation, which may itself be connate in the adjacent zone but non-connate to the zone being treated. Water may reach the zone that is the target for treatment from a variety of places, including from, through or around concrete, water from lower in the formation (water that cones upward during production), water from a fracture that penetrates a non-desired zone and the like.

The hydrocarbon-bearing formation, including clastic formations, for treatment with the compositions and methods of the present invention may be a gas well that produces at least one of gas, water, liquid water, gaseous water, water that condenses at the surface, commingled gas, or water coming out of the formation.

In one aspect, the present invention provides a method of treating a hydrocarbon-bearing clastic formation having non-connate water, the method comprising contacting the hydrocarbon-bearing clastic formation with a composition comprising solvent and a nonionic fluorinated polymeric surfactant, wherein the nonionic fluorinated polymeric surfactant comprises:

at least one divalent unit represented by formula:

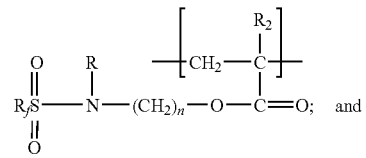

at least one divalent unit represented by formula:

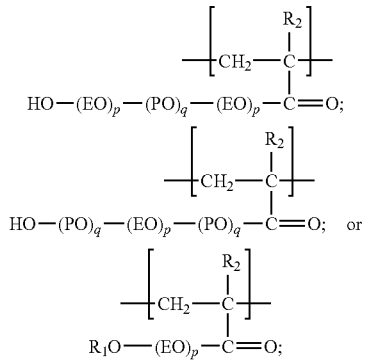

wherein
$R_f$ represents a perfluoroalkyl group having from 1 to 8 carbon atoms;
R, $R_1$ and $R_2$ are each independently hydrogen or alkyl of 1 to 4 carbon atoms;
n is an integer from 2 to 10;
EO represents $-CH_2CH_2O-$;
each PO independently represents $-CH(CH_3)CH_2O-$ or $-CH_2CH(CH_3)O-$;
each p is independently an integer of from 1 to about 128; and
each q is independently an integer of from 0 to about 55; and
wherein the solvent at least partially displaces or solubilizes the water in the formation.

In some embodiments, the non-connate water is at least one of flowing water, mobile water, immobile water, crossflow water, water in downhole fluids, water in concrete, water from adjacent perforated formations or residual water. In some embodiments, the hydrocarbon-bearing formation has at least one fracture that includes a proppant. In some embodiments, the hydrocarbon-bearing formation comprises at least one of a dry gas reservoir, a wet gas reservoir, a retrograde gas condensate reservoir, a tight gas reservoir, a coal-bed gas reservoir or a gas storage reservoir. In some embodiments, the treatment reduces non-Darcy flow. In some embodiments, the hydrocarbon-bearing formation comprises at least one of shale, conglomerate, diatomite, sand or sandstone. In some embodiments, the hydrocarbon bearing formation comprises a water damaged formation. In some embodiments, the hydrocarbon bearing formation previously treated with the nonionic fluorinated polymer further comprises the step of recharging the nonionic fluorinated polymer with a solvent treatment.

In some embodiments, the nonionic fluorinated polymeric surfactant has a number average molecular weight in the range of from 1,000 to 30,000, 40,000, 50,000, 60,000, 75,000, 100,000 or more grams/mole. In some embodiments, the solvent comprises at least one of a polyol or polyol ether, wherein the polyol and polyol ether independently have from 2 to 25 carbon atoms; and wherein the solvent comprises at least one of a monohydroxy alcohol, ether, or ketone independently having from 1 to 4 carbon atoms. In some embodiments, the hydrocarbon-bearing clastic formation has at least one first gas permeability prior to contacting the formation with the composition and at least one second gas permeability after contacting the formation with the composition, and wherein the second gas permeability is at least 5 percent (in some embodiments, at least 10, 15, 20, 25, 30, 50, 60, 75, 100, 125, 150 percent) higher than the first gas permeability. In certain embodiments, the gas permeability is gas relative permeability.

In one aspect, the present invention provides a method of treating a tight gas formation, the method comprising contacting the tight gas formation with a composition comprising a solvent and a nonionic fluorinated polymeric surfactant, wherein the nonionic fluorinated polymeric surfactant comprises:

at least one divalent unit represented by formula:

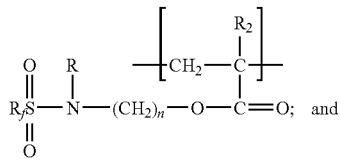

at least one divalent unit represented by formula:

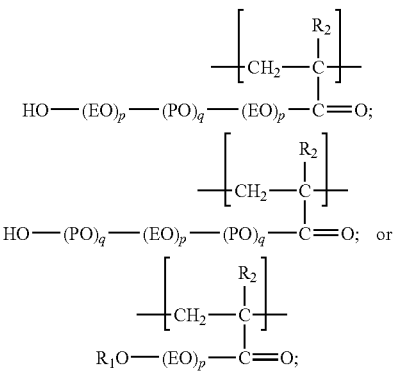

wherein
R$_f$ represents a perfluoroalkyl group having from 1 to 8 carbon atoms;
R, R$_1$ and R$_2$ are each independently hydrogen or alkyl of 1 to 4 carbon atoms;
n is an integer from 2 to 10;
EO represents —CH$_2$CH$_2$O—;
each PO independently represents —CH(CH$_3$)CH$_2$O— or —CH$_2$CH(CH$_3$)O—;
each p is independently an integer of from 1 to about 128; and
each q is independently an integer of from 0 to about 55.

In some embodiments, the tight gas formation has been fractured. In some embodiments the formation is a clastic formation. In some embodiments, the solvent comprises at least one of a polyol or polyol ether, and wherein the polyol and polyol ether independently have from 2 to 25 carbon atoms. In some embodiments, the polyol or polyol ether is at least one of 2-butoxyethanol, ethylene glycol, propylene glycol, poly(propylene glycol), 1,3-propanediol, 1,8-octanediol, diethylene glycol monomethyl ether, ethylene glycol monobutyl ether, or dipropylene glycol monomethyl ether. In some embodiments, the solvent further comprises at least one monohydroxy alcohol, ether, or ketone independently having from 1 to 4 carbon atoms. In some embodiments, the solvent comprises at least one of water, methanol, ethanol, or isopropanol.

In some embodiments, the tight gas formation has at least one first gas permeability prior to contacting the formation with the composition and at least one second gas permeability after contacting the formation with the fluid, and wherein the second gas permeability is at least 5 percent (in some embodiments, at least 10, 15, 20, 25, 30, 50, 60, 75, 100, 125, 150 percent) higher than the first gas permeability. In certain embodiments, the gas permeability is gas relative permeability.

In one aspect, the present invention provides method of reconditioning an at least partially water-blocked hydrocarbon-bearing formation treated with a first wettability modifier, wherein the first wettability modifier comprises a nonionic fluorinated polymer comprising:

at least one divalent unit represented by formula:

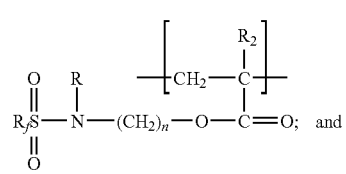

at least one divalent unit renresented by formula:

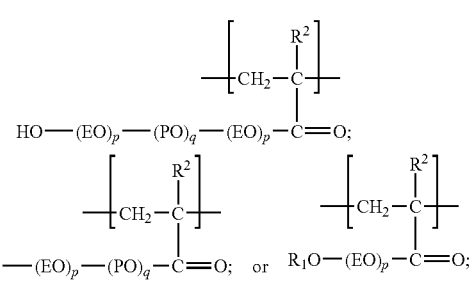

wherein
R_f represents a perfluoroalkyl group having from 1 to 8 carbon atoms;
R, R_1, and R_2 are each independently hydrogen or alkyl of 1 to 4 carbon atoms;
n is an integer from 2 to 10;
EO represents —CH$_2$CH$_2$O—;
each PO independently represents —CH(CH$_3$)CH$_2$O— or —CH$_2$CH(CH$_3$)O—;
each p is independently an integer of from 1 to about 128; and
each q is independently an integer of from 0 to about 55;
the method comprising: contacting the hydrocarbon-bearing formation with a fluid, wherein the fluid at least partially displaces or solubilizes the water in the formation. In this embodiment, the method may further comprise obtaining performance information from the hydrocarbon-bearing clastic formation after contacting the hydrocarbon-bearing clastic formation with the fluid, wherein the performance information is used to determine whether to re-treat the hydrocarbon-bearing clastic formation with a second wettability modifier. In some embodiments, the performance information comprises at least one of gas permability, relative gas permeability, production rate of gas, production rate of condensate, production rate of oil, or the productivity index (e.g., the ratio of the production rate to the difference between the average reservoir pressure and the well bottom hole pressure). In some embodiments, the method further comprises re-treating the hydrocarbon-bearing clastic formation with a composition comprising solvent and the second wettability modifier, wherein the second wettability modifier comprises a nonionic fluorinated polymeric surfactant, wherein the nonionic fluorinated polymeric surfactant comprises:

at least one divalent unit represented by formula:

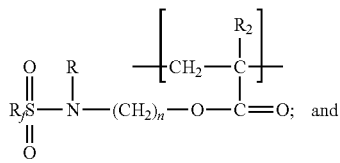

at least one divalent unit represented by formula:

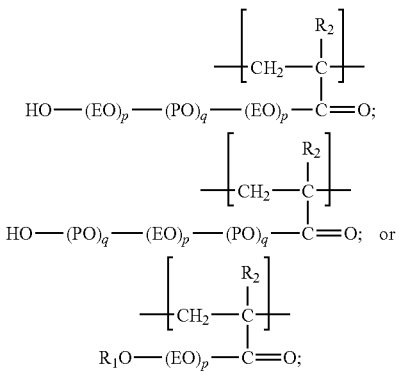

wherein
R_f represents a perfluoroalkyl group having from 1 to 8 carbon atoms;
R, R_1, and R_2 are each independently hydrogen or alkyl of 1 to 4 carbon atoms;
n is an integer from 2 to 10;
EO represents —CH$_2$CH$_2$O—;
each PO independently represents —CH(CH$_3$)CH$_2$O— or —CH$_2$CH(CH$_3$)O—;
each p is independently an integer of from 1 to about 128; and
each q is independently an integer of from 0 to about 55.

In one aspect, the present invention provides a method of treating a hydrocarbon-bearing clastic formation comprising a water-producing well, the method comprising contacting the hydrocarbon-bearing clastic formation with a composition comprising solvent and a nonionic fluorinated polymeric surfactant, wherein the nonionic fluorinated polymeric surfactant comprises:

at least one divalent unit represented by formula:

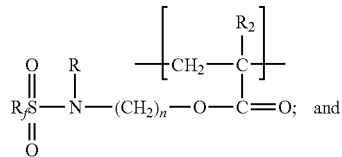

at least one divalent unit represented by formula:

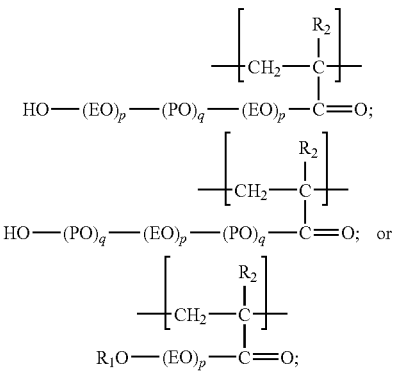

wherein
R_f represents a perfluoroalkyl group having from 1 to 8 carbon atoms;
R, R_1, and R_2 are each independently hydrogen or alkyl of 1 to 4 carbon atoms;
n is an integer from 2 to 10;
EO represents —CH$_2$CH$_2$O—;
each PO independently represents —CH(CH$_3$)CH$_2$O— or —CH$_2$CH(CH$_3$)O—;
each p is independently an integer of from 1 to about 128; and
each q is independently an integer of from 0 to about 55; and
wherein the solvent at least partially displaces or solubilizes the water in the hydrocarbon-bearing clastic formation.

In one aspect, the present invention provides a method of treating a hydrocarbon-bearing clastic formation that is not free-flowing, the method comprising contacting the hydrocarbon-bearing clastic formation with a composition in a sufficient amount to cause the formation to become free-flowing, the composition comprising a solvent and a nonionic fluorinated polymeric surfactant, wherein the nonionic fluorinated polymeric surfactant comprises:

at least one divalent unit represented by formula:

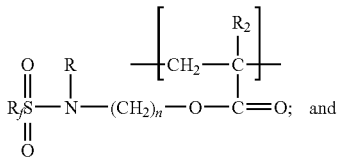

at least one divalent unit represented by formula:

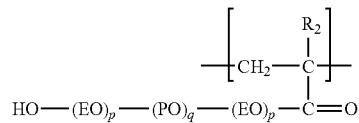

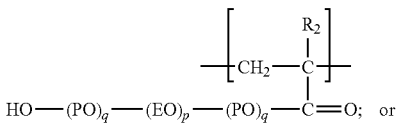

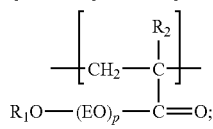

wherein
  $R_f$ represents a perfluoroalkyl group having from 1 to 8 carbon atoms;
  R, $R_1$ and $R_2$ are each independently hydrogen or alkyl of 1 to 4 carbon atoms;
  n is an integer from 2 to 10;
  EO represents —$CH_2CH_2O$—;
  each PO independently represents —$CH(CH_3)CH_2O$— or —$CH_2CH(CH_3)O$—;
  each p is independently an integer of from 1 to about 128; and
  each q is independently an integer of from 0 to about 55.

In one aspect, the present invention provides a method of treating a hydrocarbon-bearing clastic formation having non-connate water, wherein prior to being shut-in the well had a first production rate and after shut-in the well has a second production rate, wherein the second production rate is less than the first production rate, the method comprising:
  contacting the hydrocarbon-bearing clastic formation with a composition in a sufficient amount to provide the well with a third production rate, wherein the third production rate is higher than the second production rate, wherein the composition comprises solvent and a nonionic fluorinated polymeric surfactant, wherein the nonionic fluorinated polymeric surfactant comprises:
    at least one divalent unit represented by formula:

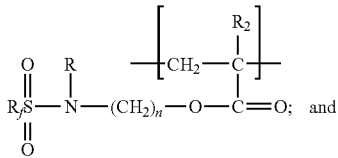

at least one divalent unit represented by formula:

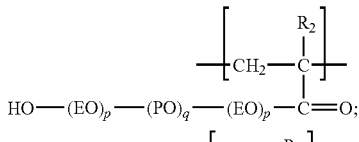

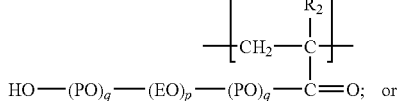

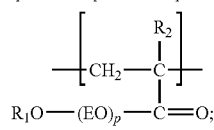

wherein
  $R_f$ represents a perfluoroalkyl group having from 1 to 8 carbon atoms;
  R, $R_1$ and $R_2$ are each independently hydrogen or alkyl of 1 to 4 carbon atoms;
  n is an integer from 2 to 10;
  EO represents —$CH_2CH_2O$—;
  each PO independently represents —$CH(CH_3)CH_2O$— or —$CH_2CH(CH_3)O$—;
  each p is independently an integer of from 1 to about 128; and
  each q is independently an integer of from 0 to about 55.

In some embodiments, the third production rate is at least 50 percent (in some embodiments, at least 60, 75, 80, 90, 100, 125, 150 or 200 percent) of the first production rate.

In one aspect, the present invention provides a method of treating a hydrocarbon-bearing clastic formation having mobile water and at least one temperature, wherein the mobile water has at least one first composition, the method comprising:
  obtaining first compatibility information for a first model brine and a first treatment composition at a model temperature, wherein the first model brine has a composition selected at least partially based on the mobile water composition, wherein the model temperature is selected at least partially based on the formation temperature, and wherein the first treatment composition comprises at least one first surfactant and at least one first solvent;
  based at least partially on the first compatibility information, selecting a treatment method for the hydrocarbon-bearing clastic formation, wherein the treatment method is Method I or Method II,
wherein Method I comprises:
  contacting the hydrocarbon-bearing clastic formation with a fluid, wherein the fluid at least one of at least partially solubilizes or at least partially displaces the mobile water in the hydrocarbon-bearing clastic formation; and
  subsequently contacting the hydrocarbon-bearing clastic formation with the first treatment composition; and
wherein Method II comprises:
  contacting the hydrocarbon-bearing clastic formation with a second treatment composition, the second treatment composition comprising at least one second surfactant and at least one second solvent, with the proviso that after obtaining the first compatibility information, the hydrocarbon-bearing clastic formation is not contacted with a fluid that at least one of at least partially solubilizes or at least partially displaces the mobile water in the hydrocarbon-bearing clastic formation prior to contacting the hydrocarbon-bearing clastic formation with the second treatment composition; and treating the hydrocarbon-bearing clastic formation with the selected treatment method.

In one aspect, the present invention provides a method of treating a hydrocarbon-bearing clastic formation having non-connate water, the method comprising:

contacting the hydrocarbon-bearing clastic formation with a fluid, wherein the fluid at least one of at least partially solubilizes or at least partially displaces the non-connate water in the hydrocarbon-bearing clastic formation; and subsequently contacting the hydrocarbon-bearing clastic formation with a composition, the composition comprising:

a nonionic fluorinated polymeric surfactant, wherein the nonionic fluorinated polymeric surfactant comprises:

at least one divalent unit represented by formula:

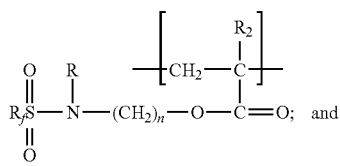

at least one divalent unit represented by formula:

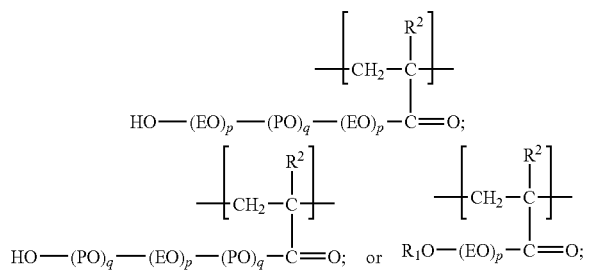

wherein
  $R_f$ represents a perfluoroalkyl group having from 1 to 8 carbon atoms;
  R, $R_1$ and $R_2$ are each independently hydrogen or alkyl of 1 to 4 carbon atoms;
  n is an integer from 2 to 10;
  EO represents —$CH_2CH_2O$—;
  each PO independently represents —$CH(CH_3)CH_2O$— or —$CH_2CH(CH_3)O$—;
  each p is independently an integer of from 1 to about 128; and
each q is independently an integer of from 0 to about 55; and
solvent, wherein when the composition is contacting the hydrocarbon-bearing clastic formation, the nonionic fluorinated polymeric surfactant has a cloud point that is above the temperature of the hydrocarbon-bearing clastic formation.

BRIEF DESCRIPTION OF THE DRAWINGS

For a more complete understanding of the features and advantages of the present invention, reference is now made to the detailed description of the invention along with the accompanying figures in which.

DETAILED DESCRIPTION OF THE INVENTION

Figures 1, 2:
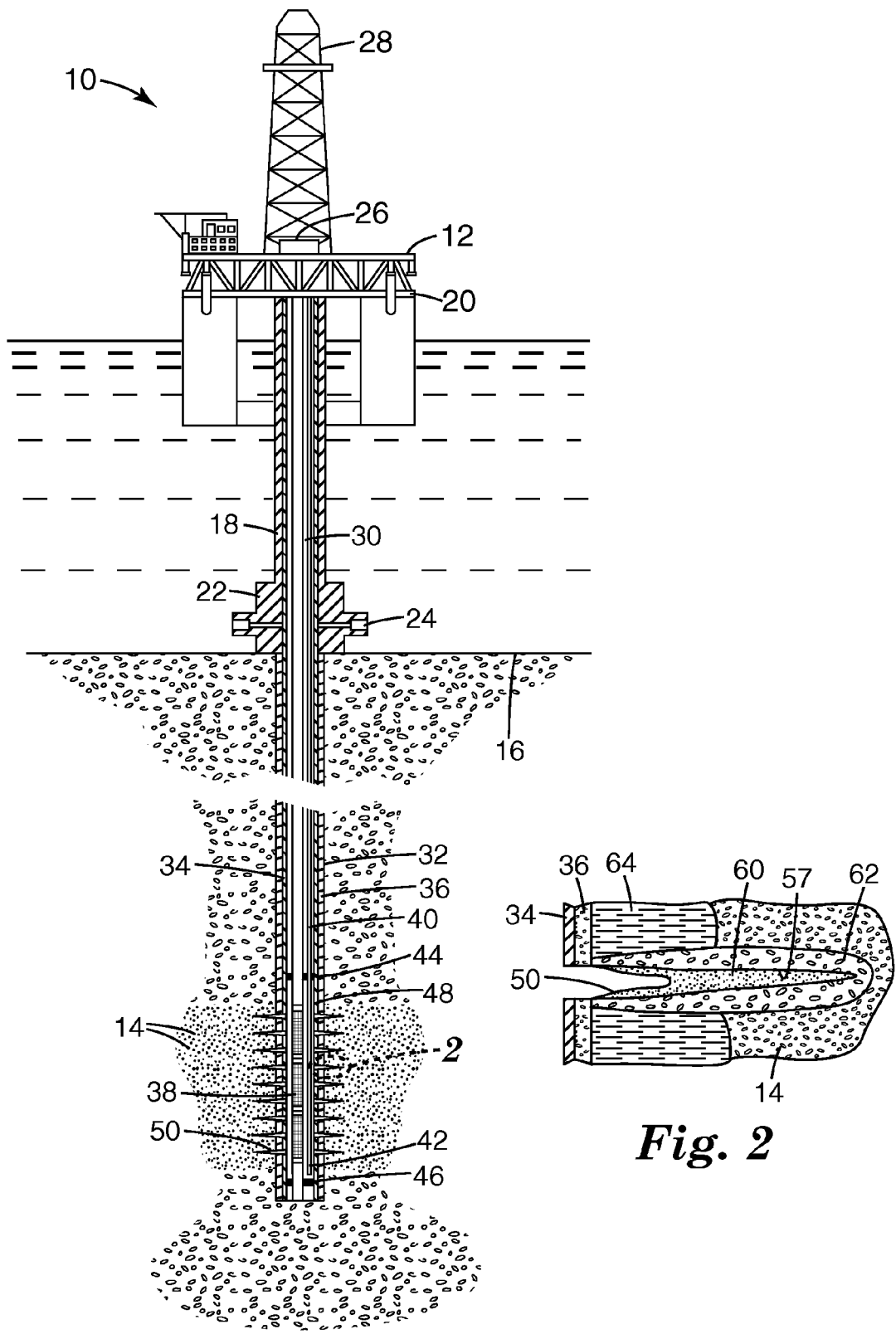
FIG. 1 is a schematic illustration of an exemplary embodiment of an offshore oil and gas platform operating an apparatus for treating a near wellbore region according to the present invention.
FIG. 2 shows the near wellbore region with a fracture in greater detail (for those embodiments related to a fractured formation)

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims. The following definitions of terms apply throughout the specification and claims.

The term "brine" refers to water having at least one dissolved electrolyte salt therein (e.g., having any nonzero concentration, and which may be, in some embodiments, less than 1000 parts per million by weight (ppm), or greater than 1000 ppm, greater than 10,000 ppm, greater than 20,000 ppm, 30,000 ppm, 40,000 ppm, 50,000 ppm, 100,000 ppm, 150,000 ppm, or even greater than 200,000 ppm).

The term "cloud point" of a surfactant refers to the temperature at which a nonionic surfactant becomes non-homogeneous in water. This temperature can depend on many variables (e.g., surfactant concentration, solvent concentration, solvent composition, water concentration, electrolyte composition and concentration, oil phase concentration and composition, and the presence of other surfactants).

The term "downhole conditions" refers to the temperature, pressure, humidity, and other conditions that are commonly found in subterranean formations.

The term "homogeneous" means macroscopically uniform throughout and not prone to spontaneous macroscopic phase separation.

The term "hydrocarbon-bearing formation" includes both hydrocarbon-bearing formations in the field (i.e., subterranean hydrocarbon-bearing formations) and portions of such hydrocarbon-bearing formations (e.g., core samples).

The term "fracture" refers to a fracture that is man-made. In the field, for example, fractures are typically made by injecting a fracturing fluid into a subterranean geological formation at a rate and pressure sufficient to open a fracture therein (i.e., exceeding the rock strength).

The term "hydrolyzable silane group" refers to a group having at least one Si—O—Z moiety that undergoes hydrolysis with water at a pH between about 2 and about 12, wherein Z is H or substituted or unsubstituted alkyl or aryl.

The term "nonionic" refers to surfactant being free of ionic groups (e.g., salts) or groups (e.g., —CO$_2$H, —SO$_3$H, —OSO$_3$H, —P(=O)(OH)$_2$) that are readily substantially ionized in water.

The term "normal boiling point" refers to the boiling point at a pressure of one atmosphere (100 kPa).

The term "polymer" refers to a molecule of molecular weight of at least 1000 grams/mole, the structure of which essentially includes the multiple repetition of units derived, actually or conceptually, from molecules of low relative molecular mass.

The term "polymeric" refers to including a polymer.

The term "solvent" refers to a homogenous liquid material (inclusive of any water with which it may be combined) that is capable of at least partially dissolving the nonionic fluorinated polymeric surfactant(s) with which it is combined at 25° C.

The term "water-miscible" means soluble in water in all proportions.

The term "productivity" as applied to a well refers to the capacity of a well to produce hydrocarbons; that is, the ratio of the hydrocarbon flow rate to the pressure drop, where the pressure drop is the difference between the average reservoir pressure and the flowing bottom hole well pressure (i.e., flow per unit of driving force).

As used herein, the term "substantially free of precipitated salt" refers to the amount of salts found in water under downhole conditions that precipitate and do not interfere with the interaction (e.g., adsorption) of the surfactant with the formation, fracture or proppants, and in some instances the amount of salts may be zero. In one example, substantially free of precipitated salt is an amount of salt that is the less than 5% higher than the solubility product at a given temperature and pressure. In another example, a formation becomes substantially free of precipitated salt when the amount of salt in the formation has been reduced, dissolved or displaced such that the salts do not interfere with the binding of the surfactant with the formation.

Many natural gas wells, especially those having so called tight or very low permeability formations, may be treated according to the present invention to improve their productivity index (PI). The increase in PI is often not as great as expected or desired due to damage in the fracture, liquid blocking and inertial or non-Darcy flow at high gas velocities. Applicants have discovered that compositions mixture of solvents with fluorocarbon surfactants may be used to treat water-blocked formations to improve their productivity index. Not wanting to be bound by theory, it is believed that, for embodiments in which the formation is fractured, the mechanisms include an increase in the gas permeability (e.g., gas relative permeability) and a reduction of inertial effects that decrease the flow of gas at high rates when water and/or condensate is removed from the porous medium. Further not wanting to be bound by theory, it is believed that, the chemical treatment may be useful in both clastic and carbonate formations since it is the hydraulic fracture that is primarily being treated rather than the formation. Often, a relatively small treatment volume may be needed since the pore volume in the propped fracture may be small. Some leak off to the formation may happen and may provide additional benefit by treatment of the rock immediately around the fracture, in some cases, but the primary stimulation target is the fracture itself. The treatment may be useful in fractures in both natural gas wells and gas condensate wells. In some embodiments, for example, when the salinity is high a preflush may be desirable.

In some embodiments, hydrocarbon-bearing formations that can be treated according to methods of the present invention have at least one fracture (in some embodiments, at least 2, 3, 4, 5, 6, 7, 8, 9, or even 10 or more fractures). The volume of a fracture can be measured using methods that are known in the art (e.g., by pressure transient testing of a fractured well). Typically, when a fracture is created in a hydrocarbon-bearing subterranean formation, the volume of the fracture can be estimated using at least one of the known volume of fracturing fluid or the known amount of proppant used during the fracturing operation.

In some embodiments, the hydrocarbon-bearing clastic formation has at least one fracture. In some of these embodiments, the fracture has a plurality of proppants therein. Fracture proppant materials are typically introduced into the formation as part of a hydraulic fracture treatment. Exemplary proppants known in the art include those made of sand (e.g., Ottawa, Brady or Colorado Sands, often referred to as white and brown sands having various ratios), resin-coated sand (e.g., "ACME BORDEN PR 6000" or "SANTROL TEMPERED HS"), glass, sintered bauxite, ceramics (i.e., glasses, crystalline ceramics, glass-ceramics, and combinations thereof), thermoplastics, organic materials (e.g., ground or crushed nut shells, seed shells, fruit pits, and processed wood), and clay. Sand proppants are available, for example, from Badger Mining Corp., Berlin, Wis.; Borden Chemical, Columbus, Ohio; and Fairmont Minerals, Chardon, Ohio. Thermoplastic proppants are available, for example, from the Dow Chemical Company, Midland, Mich.; and BJ Services, Houston, Tex. Clay-based proppants are available, for example, from CarboCeramics, Irving, Tex.; and Saint-Gobain, Courbevoie, France. Sintered bauxite ceramic proppants are available, for example, from Borovichi Refractories, Borovichi, Russia; 3M Company, St. Paul, Minn.; CarboCeramics; and Saint Gobain. Glass bubble and bead proppants are available, for example, from Diversified Industries, Sidney, British Columbia, Canada; and 3M Company. In some embodiments, the proppants form packs within a formation and/or wellbore. Proppants may be selected to be chemically compatible with the fluids and compositions described herein. Non-limiting examples of particulate solids include fracture proppant materials introducible into the formation as part of a hydraulic fracture treatment and sand control particulate introducible into the wellbore/formation as part of a sand control treatment such as a gravel pack or frac pack.

The present invention includes compositions and methods for removing water from the near-wellbore portion of a hydrocarbon-bearing formation and penetrated by a wellbore, and more particularly, to the use of a wettability modifier that includes a nonionic fluorinated polymer to remove water-blockage to improve well productivity.

Compositions useful in practicing the present invention comprise a nonionic fluorinated polymeric surfactant and solvent.

Useful nonionic fluorinated polymeric surfactants comprise:

at least one divalent unit represented by formula:

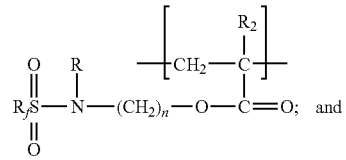

at least one divalent unit represented by formula:

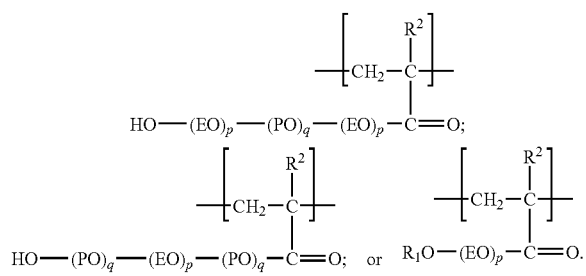

$R_f$ represents a perfluoroalkyl group having from 1 to 8 carbon atoms. Exemplary groups $R_f$ include perfluoromethyl, perfluoroethyl, perfluoropropyl, perfluorobutyl (e.g., perfluoro-n-butyl or perfluoro-sec-butyl), perfluoropentyl, perfluorohexyl, perfluoroheptyl, and perfluorooctyl.

R, $R_1$, and $R_2$ are each independently hydrogen or alkyl of 1 to 4 carbon atoms (e.g., methyl, ethyl, n-propyl, isopropyl, butyl, isobutyl, or t-butyl).

n is an integer from 2 to 10.

EO represents —$CH_2CH_2O$—.

Each PO independently represents —$CH(CH_3)CH_2O$— or —$CH_2CH(CH_3)O$—.

Each p is independently an integer of from 1 to about 128.

Each q is independently an integer of from 0 to about 55. In some embodiments, q may be in a range of from 1 to 55 and the ratio p/q has a value of from at least 0.5, 0.75, 1 or 1.5 to 2.5, 2.7, 3, 4, 5, or more.

The nonionic fluorinated polymeric surfactants described hereinabove are typically preparable by copolymerization of:
at least one compound represented by formula

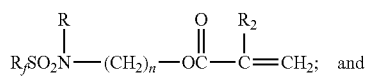

at least one compound represented by formula:

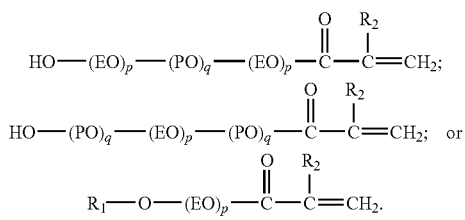

The nonionic fluorinated polymeric surfactants described above can be prepared, for example, by techniques known in the art (e.g., by free radical initiated copolymerization of a nonafluorobutanesulfonamido group-containing acrylate with a poly(alkyleneoxy) acrylate (e.g., monoacrylate or diacrylate) or mixtures thereof). Adjusting the concentration and activity of the initiator, the concentration of monomers, the temperature, and the chain-transfer agents can control the molecular weight of the polyacrylate copolymer. The description of the preparation of such polyacrylates is described, for example, in U.S. Pat. No. 3,787,351 (Olson), the disclosure of which is incorporated herein by reference. Preparation of nonafluorobutanesulfonamido acrylate monomers are described, for example, in U.S. Pat. No. 2,803,615 (Ahlbrecht et al.), the disclosure of which is incorporated herein by reference. Examples of fluoroaliphatic polymeric esters and their preparation are described, for example, in U.S. Pat. No. 6,664,354 (Savu et al.), the disclosure of which is incorporated herein by reference.

Methods described above for making nonafluorobutylsulfonamido group-containing structures can be used to make heptafluoropropylsulfonamido groups by starting with heptafluoropropylsulfonyl fluoride, which can be made, for example, by the methods described in Examples 2 and 3 of U.S. Pat. No. 2,732,398 (Brice et al.), the disclosure of which is incorporated herein by reference.

Useful nonionic fluorinated polymeric surfactants typically have a number average molecular weight in the range of from 1,000 to 10,000 grams/mole, 20,000 grams/mole, or even 30,000 grams/mole, 40,000 grams/mole, 50,000 grams/mole or even 100,000 grams/mole although higher and lower molecular weights may also be useful. It is also within the scope of the present invention to use mixtures of nonionic fluorinated polymeric surfactants.

In some embodiments, the nonionic fluorinated polymeric surfactant is free of hydrolyzable silane groups. This may be advantageous, for example, by prolonging the storage-life of the composition.

In some embodiments, wherein the hydrocarbon-bearing formation has at least one fracture that includes a proppant, nonionic fluorinated polymeric surfactants useful in practicing the present invention interact with at least a portion of the plurality of proppants, (i.e., change the wettability of the proppants). Nonionic fluorinated polymeric surfactants may interact with the plurality of proppants, for example, by adsorbing to the surfaces of the proppants (in either clastic or non-clastic formations). Methods of determining the interaction of nonionic fluorinated polymeric surfactants with proppants include the measurement of the conductivity of the fracture.

In some embodiments, (e.g., in hydrocarbon-bearing clastic formations), nonionic fluorinated polymeric surfactants useful in practicing the present invention modify the wetting properties of the rock in a near wellbore region of a hydrocarbon-bearing formation (e.g., in the fracture).

Although not wanting to be bound by theory, it is believed the nonionic fluorinated polymeric surfactants generally adsorb to clastic formations under downhole conditions.

Again, not wanting to be bound by theory, for embodiments wherein the hydrocarbon-bearing formation is fractured, it is believed that nonionic fluorinated polymeric surfactants generally adsorb to the surfaces of proppants and the rock surface in fractured hydrocarbon-bearing clastic formation and typically remain at the target site for the duration of an extraction (e.g., 1 week, 2 weeks, 1 month, or longer).

The solvent may a single component or a mixture of components. Solvents useful in practicing the present invention include polar solvents such as alcohols (e.g., methanol, ethanol, isopropanol, propanol, and butanol), glycols (e.g., ethylene glycol and propylene glycol), and glycol ethers (e.g., ethylene glycol monobutyl ether and glycol ethers available from Dow Chemical Co., Midland, Mich., under the trade designation "DOWANOL"); easily gasified fluids (e.g., ammonia, low molecular weight hydrocarbons or substituted hydrocarbons, condensate, and supercritical or liquid carbon dioxide), and mixtures thereof. In some embodiments, the solvent is water-miscible.

Examples of useful solvents include organic solvents, water, and combinations thereof. Examples of organic solvents include polar and/or water-miscible solvents such as monohydroxy alcohols independently having from 1 to 4 or more carbon atoms (e.g., methanol, ethanol, isopropanol, propanol, and butanol); polyols such as, for example, glycols (e.g., ethylene glycol or propylene glycol), terminal alkanediols (e.g., 1,3-propanediol, 1,4-butanediol, 1,6-hexanediol, or 1,8-octanediol), polyglycols (e.g., diethylene glycol, triethylene glycol, or dipropylene glycol) and triols (e.g., glycerol, trimethylolpropane); ethers (e.g., diethyl ether, methyl t-butyl ether, tetrahydrofuran, p-dioxane; polyol ethers (e.g., glycol ethers (e.g., ethylene glycol monobutyl ether, diethylene glycol monomethyl ether, dipropylene glycol monomethyl ether, propylene glycol monomethyl ether, or those glycol ethers available under the trade designation "DOWANOL" from Dow Chemical Co., Midland, Mich.); ketones (e.g., acetone or 2-butanone), easily gasified fluids (e.g., ammonia, low molecular weight hydrocarbons or substituted hydrocarbons, condensate, and supercritical or liquid carbon dioxide), and mixtures thereof.

In some embodiments, the solvent consists essentially of (i.e., does not contain any components that materially affect water solubilizing or displacement properties of the composition under downhole conditions) at least one of a polyol independently having from 2 to 25 (in some embodiments, 2 to 10) carbon atoms or polyol ether independently having from 2 to 25 (in some embodiments, 2 to 10) carbon atoms, and at least one monohydroxy alcohol independently having from 1 to 4 carbon atoms, ether independently having from 1 to 4 carbon atoms, or ketone having from 1 to 4 carbon atoms, or a mixture thereof.

In some embodiments, the solvent comprises at least one polyol and/or polyol ether that independently has from 2 to 25 (in some embodiments from 2 to 20 or even from 2 to 10) carbon atoms.

As used herein in referring to the solvent, the term "polyol" refers to an organic molecule consisting of C, H, and O atoms connected one to another by C—H, C—C, C—O, O—H single bonds, and having at least two C—O—H groups. For example, useful polyols may have independently from 2 to 8 carbon atoms or independently from 2 to 6 carbon atoms, and useful polyol ethers may independently have from 3 to 10 carbon atoms, for example, independently from 3 to 8 carbon atoms or independently from 5 to 8 carbon atoms. Exemplary useful polyols include ethylene glycol, propylene glycol, poly(propylene glycol), 1,3-propanediol, trimethylolpropane, glycerol, pentaerythritol, and 1,8-octanediol.

As used herein in referring to the solvent, the term "polyol ether" refers to an organic molecule consisting of C, H, and O atoms connected one to another by C—H, C—C, C—O, O—H single bonds, and which is at least theoretically derivable by at least partial etherification of a polyol. Exemplary useful polyol ethers include diethylene glycol monomethyl ether, ethylene glycol monobutyl ether, and dipropylene glycol monomethyl ether. The polyol and/or polyol ether may have a normal boiling point of less than 450° F. (232° C.); for example, to facilitate removal of the polyol and/or polyol ether from a well after treatment.

In some embodiments, the polyol or polyol ether is independently at least one of 2-butoxyethanol, ethylene glycol, propylene glycol, poly(propylene glycol), 1,3-propanediol, 1,8-octanediol, diethylene glycol monomethyl ether, ethylene glycol monobutyl ether, or dipropylene glycol monomethyl ether.

In some embodiments, the solvent further comprises at least one monohydroxy alcohol, ether, and/or ketone that may independently have up to (and including) 4 carbon atoms. It is recognized that, by definition, ethers must have at least 2 carbon atoms, and ketones must have at least 3 carbon atoms.

As used herein in referring to the solvent, the term "monohydroxy alcohol" refers to an organic molecule formed entirely of C, H, and O atoms connected one to another by C—H, C—C, C—O, O—H single bonds, and having exactly one C—O—H group. Exemplary monohydroxy alcohols having independently from 1 to 4 carbon atoms include methanol, ethanol, n-propanol, isopropanol, 1-butanol, 2-butanol, isobutanol, and t-butanol.

As used herein in referring to the solvent, the term "ether" refers to an organic molecule formed entirely of C, H, and O atoms connected one to another by C—H, C—C, C—O, O—H single bonds, and having at least one C—O—C group. Exemplary ethers having from 2 to 4 carbon atoms include diethyl ether, ethylene glycol methyl ether, tetrahydrofuran, p-dioxane, and ethylene glycol dimethyl ether.

As used herein in referring to the solvent, the term "ketone" refers to an organic molecule formed entirely of C, H, and O atoms connected one to another by C—H, C—C, C—O single bonds and C=O double bonds, and having at least one C—C(=O)—C group. Exemplary ketones having from 3 to 4 carbon atoms include acetone, 1-methoxy-2-propanone, and 2-butanone.

In some embodiments, the solvent is generally capable of solubilizing and/or displacing brine and/or condensate in the formation or, in some embodiments, in the fracture. Examples of brine include connate or non-connate water, mobile or immobile water and the like. For example, the solvent may be capable of at least one of solubilizing or displacing brine in the formation or the fracture. Likewise, the solvent may be, for example, capable of at least one of solubilizing or displacing condensate in the formation or the fracture. In some embodiments, methods according to the present invention are typically useful for treating fractures in hydrocarbon-bearing formations containing brine and/or condensate.

Although not wanting to be bound by theory, for embodiments wherein the hydrocarbon-bearing formation is fractured, it is believed that the effectiveness of compositions described herein for improving the conductivity of a particular fracture having brine (and/or condensate) therein will typically be determined by the ability of the composition to dissolve the quantity of brine (and/or condensate) present in the fracture. Hence, at a given temperature greater amounts of compositions having lower brine (and/or condensate) solubility (i.e., compositions that can dissolve a relatively lower amount of brine or condensate) will typically be needed than in the case of compositions having higher brine (and/or condensate) solubility and containing the same surfactant at the same concentration.

Typically, compositions useful in practicing the present invention include from at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.5, 1, 1.5, 2, 3, 4, or 5 percent by weight, up to 5, 6, 7, 8, 9, or 10 percent by weight of the nonionic fluorinated polymeric surfactant, based on the total weight of the composition. For example, the amount of the nonionic fluorinated polymeric surfactant in the compositions may be in a range of from 0.01 to 10, 0.1 to 10, 0.1 to 5, 1 to 10, or even in a range from 1 to 5 percent by weight of the nonionic fluorinated polymeric surfactant, based on the total weight of the composition. Lower and higher amounts of the nonionic fluorinated polymeric surfactant in the compositions may also be used, and may be desirable for some applications.

The amount of solvent in the composition typically varies inversely with the amount of components in compositions useful in practicing the present invention. For example, based on the total weight of the composition the solvent may be present in the composition in an amount of from at least 10, 20, 30, 40, or 50 percent by weight or more up to 60, 70, 80, 90, 95, 98, or even 99 percent by weight, or more.

In some embodiments, compositions useful in practicing the present invention may further include water (e.g., in the solvent). In some embodiments, compositions according to the present invention are essentially free of water (i.e., contains less than 0.1 percent by weight of water based on the total weight of the composition).

The ingredients for compositions described herein including nonionic fluorinated polymeric surfactant and solvent can be combined using techniques known in the art for combining these types of materials, including using conventional magnetic stir bars or mechanical mixer (e.g., in-line static mixer and recirculating pump).

Generally, the amount of the nonionic fluorinated polymeric surfactant and solvent (any type of solvent) is dependent on the particular application since conditions typically vary between hydrocarbon-bearing formations, for example, at different depths in the formation, and even over time in a given formation. Advantageously, methods according to the present invention can be customized for individual formations and conditions.

Without wishing to be bound by theory, it is believed that more desirable well treatment results are obtained when the treatment composition used in a particular near wellbore region of a well is homogenous at the temperature(s) encountered in the near wellbore region. Accordingly, the treatment composition is typically selected to be homogenous at temperature(s) found in the portion of hydrocarbon-bearing formation (e.g., a near well bore region) to be treated.

Fluids (including liquids and gases) useful in practicing the present invention at least one of at least partially solubilizes or at least partially displaces the brine in the hydrocarbon-bearing clastic formation. In some embodiments, the fluid at least partially displaces the brine in the hydrocarbon-bearing clastic formation. In some embodiments, the fluid at least partially solubilizes brine in the hydrocarbon-bearing clastic formation. Examples of useful fluids include polar and/or water-miscible solvents such as monohydroxy alcohols having from 1 to 4 or more carbon atoms (e.g., methanol, ethanol, isopropanol, propanol, or butanol); polyols such as glycols (e.g., ethylene glycol or propylene glycol), terminal alkanediols (e.g., 1,3-propanediol, 1,4-butanediol, 1,6-hexanediol, or 1,8-octanediol), polyglycols (e.g., diethylene glycol, triethylene glycol, or dipropylene glycol) and triols (e.g., glycerol, trimethylolpropane); ethers (e.g., diethyl ether, methyl t-butyl ether, tetrahydrofuran, p-dioxane); polyol ethers such as glycol ethers (e.g., ethylene glycol monobutyl ether, diethylene glycol monomethyl ether, dipropylene glycol monomethyl ether, propylene glycol monomethyl ether, or those glycol ethers available under the trade designation "DOWANOL" from Dow Chemical Co., Midland, Mich.); and ketones (e.g., acetone or 2-butanone). Useful fluids also include liquid or gaseous hydrocarbons (e.g., toluene, diesel, heptane, octane, condensate, methane, and isoparaffinic solvents obtained from Total Fina, Paris, France, under trade designation "ISANE" and from Exxon Mobil Chemicals, Houston, Tex., under the trade designation "ISOPAR") and other gases (e.g., nitrogen and carbon dioxide).

Methods according to the present invention may be useful, for example, for recovering hydrocarbons (e.g., at least one of methane, ethane, propane, butane, hexane, heptane, or octane) from hydrocarbon-bearing subterranean clastic formations (in some embodiments, predominantly sandstone) or from hydrocarbon-bearing subterranean non-clastic formations (in some embodiments, predominantly limestone).

Referring to FIG. 1, an exemplary offshore oil and gas platform is schematically illustrated and generally designated 10. Semi-submersible platform 12 is centered over submerged hydrocarbon-bearing formation 14 located below sea floor 16. Subsea conduit 18 extends from deck 20 of platform 12 to wellhead installation 22 including blowout preventers 24. Platform 12 is shown with hoisting apparatus 26 and derrick 28 for raising and lowering pipe strings such as work string 30.

Wellbore 32 extends through the various earth strata including hydrocarbon-bearing formation 14. Casing 34 is cemented within wellbore 32 by cement 36. Work string 30 may include various tools including, for example, sand control screen assembly 38 which is positioned within wellbore 32 adjacent to hydrocarbon-bearing formation 14. Also extending from platform 12 through wellbore 32 is fluid delivery tube 40 having fluid or gas discharge section 42 positioned adjacent to hydrocarbon-bearing formation 14, shown with production zone 48 between packers 44, 46. When it is desired to treat near-wellbore region 55 of hydrocarbon-bearing formation 14 adjacent to production zone 48, work string 30 and fluid delivery tube 40 are lowered through casing 34 until sand control screen assembly 38 and fluid discharge section 42 are positioned adjacent to the near-wellbore region 55 of hydrocarbon-bearing formation 14 including perforations 50. Thereafter, a composition described herein is pumped down delivery tube 40 to progressively treat near-wellbore region 55 of hydrocarbon-bearing formation 14.

Also shown in FIG. 2, a treatment zone is depicted next to a casing 34, cement 36 within perforation 50. In the expanded view, a fracture 57 is shown in which a proppant 60 has been added. The fracture 57 is shown in relation to the "crushed zone" 62 and regions surrounding the wellbore 32 region showing a virgin hydrocarbon-bearing formation 14. A damaged zone 64 has a lower permeability and is shown between the virgin hydrocarbon formation 14 and the casing 34.

While the drawing depicts an offshore operation, the skilled artisan will recognize that the compositions and methods for treating a production zone of a wellbore may also be suitable for use in onshore operations. Also, while the drawing depicts a vertical well, the skilled artisan will also recognize that methods of the present invention are equally well-suited for use in deviated wells, inclined wells or horizontal wells.

Figure 3:
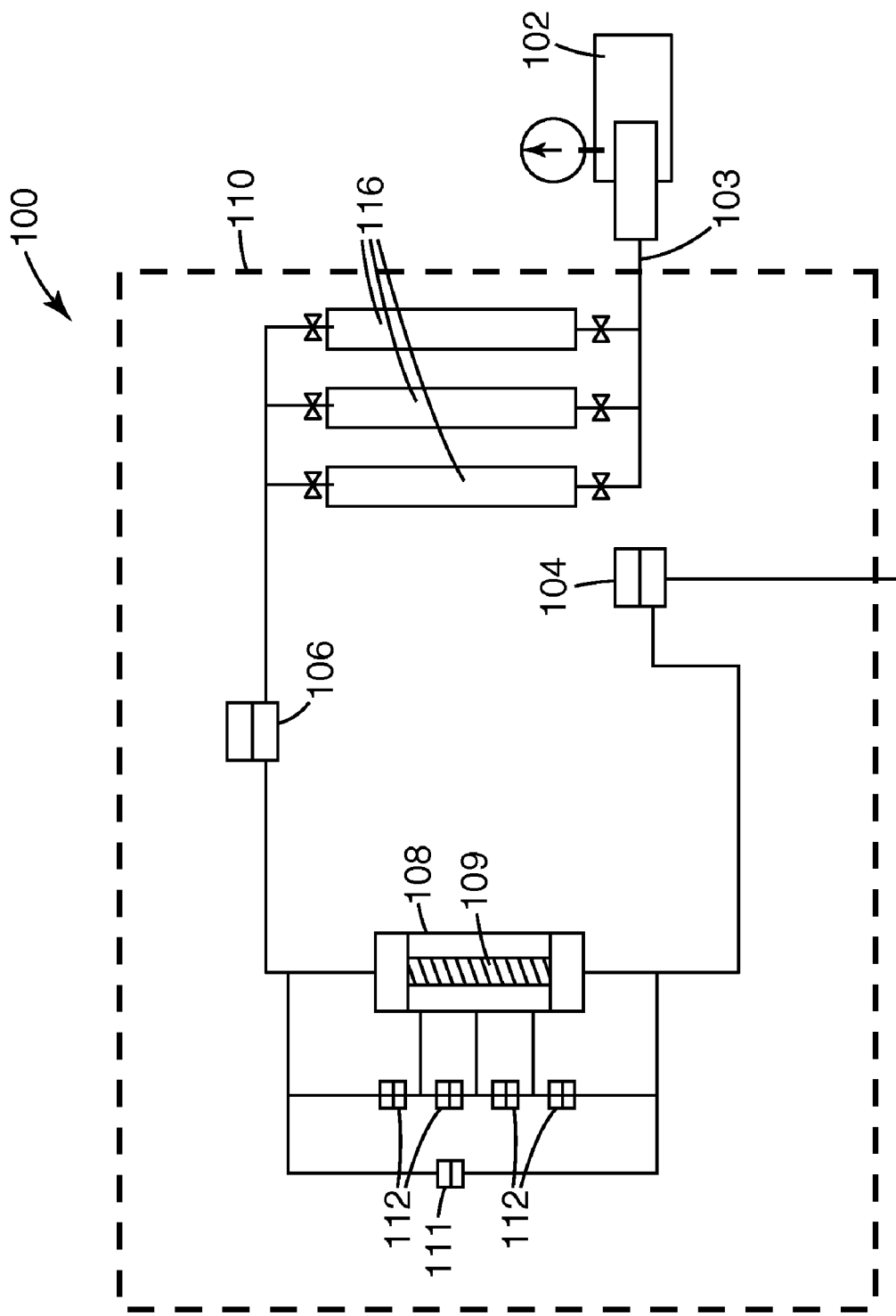
FIG. 3 is a schematic illustration of the core flood set-up for testing cores samples and other materials using the compositions and methods of the present invention.

A schematic diagram of core flood apparatus 100 used to determine relative permeability of the substrate sample is shown in FIG. 3. Core flood apparatus 100 included positive displacement pumps (Model No. 1458; obtained from General Electric Sensing, Billerica, Mass.) 102 to inject fluid 103 at constant rate in to fluid accumulators 116. Multiple pressure ports 112 on core holder 108 were used to measure pressure drop across four sections (2 inches in length each) of core 109. Pressure port 111 was used to measure the pressure drop across the whole core. Two back-pressure regulators (Model No. BPR-50; obtained from Temco, Tulsa, Okla.) 104, 106 were used to control the flowing pressure upstream 106 and downstream 104 of core 109. The flow of fluid was through a vertical core to avoid gravity segregation of the gas. High-pressure core holder (Hassler-type Model UTPT-1x8-3K-13 obtained from Phoenix, Houston, Tex.) 108, back-pressure regulators 106, fluid accumulators 116, and tubing were placed inside pressure-temperature-controlled oven (Model DC 1406F; maximum temperature rating of 650° F. (343° C.). obtained from SPX Corporation, Williamsport, Pa.) at the temperatures tested.

Typically, it is believed to be desirable to allow for a shut-in time after fractures in the hydrocarbon-bearing formations are contacted with the compositions described herein. Exemplary set in times include a few hours (e.g., 1 to 12 hours), about 24 hours, or even a few (e.g., 2 to 10) days.

The skilled artisan, after reviewing the instant disclosure, will recognize that various factors may be taken into account in practice of the present invention including, for example, the ionic strength of the composition, pH (e.g., a range from a pH of about 4 to about 10), and the radial stress at the wellbore (e.g., about 1 bar (100 kPa) to about 1000 bars (100 MPa)).

Typically, after treatment according to the present invention hydrocarbons are then obtained from the wellbore at an increased permeability rate, as compared the permeability rate prior to treatment (in embodiments where the formation has fractures, the fracture has conductivity). In some embodiments, the formation has at least one first permeability prior to contacting the formation with the composition and at least one second permeability after contacting the formation with the composition, wherein the second permeability is at least 5 (in some embodiments, 10, 20, 30, 40, 50, 60, 70, 80, 90, 100, 110, 120, 130, 140, or even 150) percent higher than the first permeability.

Methods according to the present invention may be practiced, for example, in a laboratory environment (e.g., on a core sample (i.e., a portion) of a hydrocarbon-bearing formation) or in the field (e.g., on a subterranean hydrocarbon-bearing formation situated downhole in a well). Typically, methods according to the present invention are applicable to downhole conditions having a pressure in a range of from about 1 bar (100 kPa) to about 1000 bars (100 MPa) and a temperature in a range from about 100° F. (37.8° C.) to 400° F. (204° C.), although they may also be useful to treat hydrocarbon-bearing formations under other conditions.

In addition to brine and/or condensate, other materials (e.g., asphaltene or water) may be present in the hydrocarbon-bearing formation. Methods according to the present invention may also be useful in those cases.

Various methods (e.g., pumping under pressure) known to those skilled in the oil and gas art can be used in accordance with the present invention to contact the hydrocarbon-bearing subterranean formations with compositions comprising solvent and nonionic fluorinated polymeric surfactant. Coil tubing, for example, may be used to deliver the treatment composition to a particular zone in a formation. In some embodiments, in practicing the present invention it may be desirable to isolate a particular zone in a formation (e.g., with conventional packers) to be contacted with the treatment composition.

Natural gas wells are often blocked by water from a variety of sources. The water reduces the relative permeability of the gas and reduces the productivity of the gas well. The water can come from natural sources such as an aquifer, various well stimulation methods such as fracturing that use water as a carrier fluid, and water flowing through the well from a water bearing zone to the gas bearing zone. Applicants have disclosed compositions with solvents and fluorocarbon surfactants can be used to remove water from the porous medium, restore its gas permeability to its original undamaged value and provide a durable remediation of the damage so that the gas production increases to its original high value before the damage.

The composition may include solvents, including mixtures of alcohol such as isopropanol and glycols such as propylene glycol that are tolerant of high salinity and other adverse factors commonly found in gas wells. Optionally, a screening method can be used to select desirable solvent blends of solvents for the reservoir conditions for a particular temperature. Another aspect of the invention is the use of a preflush when the salinity is high. The treatment composition can be used for both gas wells and gas condensate wells damaged by water. It can be used to stimulate both the gas formation and propped fractures that have been blocked by water. The mechanisms include an increase in the gas permeability and the reduction of inertial effects that decrease the flow of gas at high rates when water is removed from the porous medium. Still another aspect of the invention is the use of solvent mixtures to solubilize or displace brine from formations that are damaged after treatment with the fluorocarbon surfactant or damaged repeatedly by water since in such cases the solvent by itself can be used to restore the productivity of the well.

Advantages and embodiments of this invention are further illustrated by the following examples, but the particular materials and amounts thereof recited in these examples, as well as other conditions and details, should not be construed to unduly limit this invention. Unless otherwise noted, all parts, percentages, ratios, etc. in the examples and the rest of the specification are by weight.

EXAMPLE 1

A core with the dimensions specified below was cut from a source rock block. The core was dried in an oven at 100° C. for 24 hrs and then was weighed. The core was then wrapped with polytetrafluoroethylene (PTFE), aluminum foil and shrink wrapped with heat shrink tubing (obtained under the trade designation "TEFLON HEAT SHRINK TUBING" from Zeus, Inc., Orangeburg, S.C.). The wrapped core was placed into a core holder inside the oven at the temperature.

A nonionic fluorinated polymeric surfactant ("Nonionic Fluorinated Polymeric Surfactant A") was prepared essentially as in Example 4 of U.S. Pat. No. 6,664,354 (Savu), except using 15.6 grams (g) of 50/50 mineral spirits/organic peroxide initiator (tert-butyl peroxy-2-ethylhexanoate obtained from Akzo Nobel, Arnhem, The Netherlands under the trade designation "TRIGONOX-21-C50") in place of 2,2'-azobisisobutyronitrile, and with 9.9 g of 1-methyl-2-pyrrolidinone added to the charges.

A Berea sandstone with the properties given in Table 1 (below) was prepared and loaded in the core holder. A methane gas permeability of 158 md was measured at room temperature. Next connate water saturation of 30% was established in the core using brine with 15,000 ppm KCl. Methane gas was injected for 150 pore volumes. The gas permeability decreased to 102 md corresponding to a gas relative permeability at connate water saturation of 0.65.

TABLE 1

| | |
|---|---|
| Length, inches (cm) | 8.00 (20.32) |
| Porosity, % | 20.06 |
| Diameter, inches (cm) | 1 (2.54) |
| Pore Volume, cc | 20.81 |
| Length, inches (cm) | 8.00 (20.32) |
| Porosity, % | 20.06 |
| Diameter, inches (cm) | 1 (2.54) |
| Pore Volume, cc | 20.81 |

The Berea sandstone core was then treated at a reservoir temperature of 275° F. (135° C.). The composition of the treatment solution is given in Table 2, below. The treatment was allowed to soak in the sandstone core for the next 16 hours and then methane gas was again injected for 160 pore volumes. The gas permeability at steady state was 150 md. Brine was then introduced into the core to reestablish the original connate water saturation of 30% and then methane injected once again to compare its permeability with the pretreatment value at the same water saturation. The methane permeability at steady state was 150 md. This value is almost as high as the original gas permeability and 1.5 times the gas permeability at the same 30% water saturation before treatment. This is a remarkable, unexpected and very favorable result.

TABLE 2

| Component | wt % |
| --- | --- |
| 2-Butoxyethanol | 68.6 |
| Ethanol | 29.4 |
| Nonionic Fluorinated Polymeric Surfactant A | 2 |

Gas and brine were co-injected into the core to measure the relative permeability of each phase at a water fractional flow of 3.6% to represent the invasion of water into a gas zone without mobile water initially present. At steady state, the gas relative permeability was 0.066, which indicates severe damage due to water blocking. Methane was then injected to displace the mobile water in the rock. About 380 pore volumes of methane gas was injected. The final steady state gas permeability was 154 md. Surprisingly, this is essentially as high as the original gas permeability at zero water saturation even though a substantial amount of residual water was still in the core. The pressure drop of the final methane injection did not show any detectable tendency to increase with time indicating good durability of the chemical treatment.

EXAMPLE 2

The initial gas permeability was measured using nitrogen at 75° F. (23.9° C.). The initial brine saturation of 19% was established by injecting a measured volume of brine into the vacuumed core. The gas relative permeability at initial water saturation was measured using nitrogen at 75° F. (23.9° C.). Table 3 (below) summarizes the properties of the core at the listed conditions. The procedure was performed using a Berea sandstone core at a reservoir temperature of 175° F. (79.4° C.).

TABLE 3

| Core | Berea Sandstone |
| --- | --- |
| Length, inches (cm) | 8 (20.32) |
| Diameter, inches (cm) | 1 (2.54) |
| Porosity, % | 20 |
| Pore volume, cc | 20.6 |
| Swi, % | 19 |
| Temperature, ° F. (° C.) | 175 (79.4) |
| k, md | 217 |

A synthetic hydrocarbon mixture was prepared that exhibits retrograde gas condensate behavior. Table 4 (below) gives the composition of the synthetic gas mixture. A two-phase flood with the fluid mixture was done using the dynamic flashing method, which is also known as the pseudo-steady state method, by flashing the fluid through the upstream back-pressure regulartor set above the dew point pressure at 5100 psig (35.2 MPa) to the core pressure set below the dew point pressure by the downstream back-pressure regulator. This core flood was done at a core pressure of 420 psig (2.9 MPa). Table 5 (below) summarizes the results for the pre-treatment two-phase flow.

TABLE 4

| Component | Mole % |
| --- | --- |
| Methane | 89 |
| n-Butane | 5.0 |
| n-Heptane | 2.5 |
| n-Decane | 2.5 |
| n-Pentadecane | 1 |

TABLE 5

| | krg | kro | Improvement Factor |
| --- | --- | --- | --- |
| Pre-Treatment 2-phase flow ("Condensate Flood-1") | 0.065 | 0.025 | n/a |
| Post-Treatment 2-phase flow ("Condensate Flood-2") | 0.123 | 0.047 | 1.88 |
| Condensate Flood-3 | 0.134 | 0.052 | 2.05 |
| Condensate Flood-4 | 0.121 | 0.047 | 1.86 |

The core was then treated with 18 pore volumes of the composition given in Table 6(below) and then shut-in for 15 hours. The steady state two-phase flow of gas and condensate was then done under the same conditions as the pre-treatment two-phase flow. Table 5 (above) summarizes the results for the post-treatment two-phase flow. The results show that the chemical treatment increased the gas and condensate relative permeability by a factor of about 1.9.

TABLE 6

| Component | wt % |
| --- | --- |
| Nonionic Fluorinated Polymeric Surfactant A | 2 |
| 2-Butoxyethanol | 69 |
| Ethanol | 29 |

TABLE 7

| Component | wt % |
| --- | --- |
| 2-Butoxyethanol | 70 |
| Ethanol | 30 |

Next two pore volumes of three-phase gas, condensate and brine at a fractional flow of brine equal to 0.038 was injected to test the effect of mobile water on the treatment. This was followed with a fluid flush (composition given in Table 7) to remove the brine from the core and finally with the two-phase flow of the same gas condensate fluid mixture (Condensate Flood-3). Table 5 (above) summarizes the results for Condensate Flood-3. The improvement factor was found to be about 2. Although not wanting to be bound by theory, it is believed that, these results show that if a post treated gas bearing zone were, for example, invaded by mobile water due to cross flow through the wellbore from a deeper water bearing zone penetrated by the same well, the resulting damage due to water blocking could be completely reversed by solvent injection into the treated gas zone.

A similar but more severe test of the water blocking damage caused by mobile water was done by next injecting 1 pore volume of 100% brine into the same core. The core was then flooded with solvent to flush out the brine and then again with the same two-phase gas condensate fluid mixture until steady state flow of gas and condensate was established (Condensate Flood-4). Table 5 (above) summarizes the results for Condensate Flood-4. The improvement factor at this time was about 1.9.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

What is claimed is:

1. A method of treating a hydrocarbon-bearing clastic formation having water, the method comprising contacting the hydrocarbon-bearing clastic formation with a composition comprising solvent and a nonionic fluorinated polymeric surfactant, wherein the nonionic fluorinated polymeric surfactant comprises:
   at least one divalent unit represented by formula:

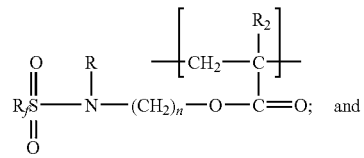

a poly(alkyleneoxy) segment;
   wherein
   $R_f$ represents a perfluoroalkyl group having from 1 to 8 carbon atoms;
   R and $R_2$ are each independently hydrogen or alkyl of 1 to 4 carbon atoms;
   n is an integer from 2 to 10; and
   wherein the solvent at least partially displaces or solubilizes the water in the hydrocarbon-bearing formation, wherein the water is non-connate water or wherein the hydrocarbon-bearing formation comprises a water-bearing well.

2. The method of claim 1, wherein the hydrocarbon-bearing formation has at least one fracture that includes a proppant.

3. The method of claim 1, wherein the hydrocarbon-bearing formation comprises at least one of a dry gas reservoir, a wet gas reservoir, a retrograde condensate gas reservoir, a tight gas reservoir, a coal-bed gas reservoir or a storage reservoir.

4. The method of claim 1, wherein the method reduces non-Darcy flow.

5. The method of claim 1, wherein the hydrocarbon-bearing formation comprises a water damaged formation.

6. The method of claim 1, wherein the solvent comprises at least one of a polyol or polyol ether, wherein the polyol and polyol ether independently have from 2 to 25 carbon atoms; and wherein the solvent comprises at least one of monohydroxy alcohol, ether, or ketone independently having from 1 to 4 carbon atoms.

7. The method of claim 1, wherein the hydrocarbon-bearing clastic formation has at least one first gas relative permeability prior to contacting the formation with the composition and at least one second gas relative permeability after contacting the formation with the composition, and wherein the second gas relative permeability is at least 5 percent higher than the first gas relative permeability.

8. The method of claim 1, wherein the hydrocarbon-bearing clastic formation having non-connate water comprises a well that was shut-in, wherein prior to being shut-in the well had a first production rate and after shut-in the well has a second production rate, wherein the second production rate is less than the first production rate, the method comprising:
   contacting the hydrocarbon-bearing clastic formation with the composition in a sufficient amount to provide the well with a third production rate, wherein the third production rate is higher than the second production rate.

9. The method of claim 1, wherein the poly(alkyleneoxy) segment comprises at least one divalent unit represented by formula:

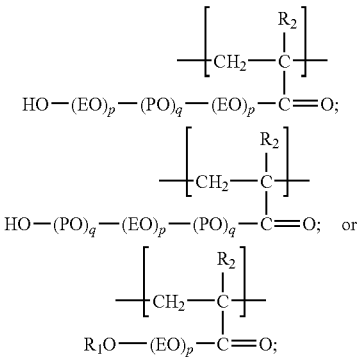

wherein
   $R_1$ and $R_2$ are each independently hydrogen or alkyl of 1 to 4 carbon atoms;
   EO represents $-CH_2CH_2O-$;
   each PO independently represents $-CH(CH_3)CH_2O-$ or $-CH_2CH(CH_3)O-$;
   each p is independently from 1 to about 128; and
   each q is independently from 0 to about 55.

10. A method of treating a tight gas formation or a hydrocarbon-bearing clastic formation that is not free-flowing, the method comprising contacting the tight gas formation or the hydrocarbon-bearing clastic formation that is not free-flowing with a composition comprising a solvent and a nonionic fluorinated polymeric surfactant, wherein the nonionic fluorinated polymeric surfactant comprises:

at least one divalent unit represented by formula:

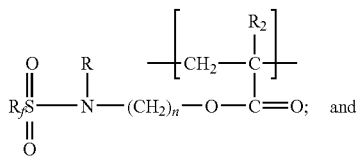

a poly(alkyleneoxy) segment;
wherein
$R_f$ represents a perfluoroalkyl group having from 1 to 8 carbon atoms;
R and $R_2$ are each independently hydrogen or alkyl of 1 to 4 carbon atoms; and
n is an integer from 2 to 10,
wherein contacting the hydrocarbon-bearing formation that is not free-flowing comprises contacting the formation with the composition in a sufficient amount to cause the formation to become free-flowing.

11. The method of claim 10, wherein the solvent comprises at least one of a polyol or polyol ether, and wherein the polyol and polyol ether independently have from 2 to 25 carbon atoms.

12. The method of claim 11, wherein the polyol or polyol ether is at least one of 2-butoxyethanol, ethylene glycol, propylene glycol, poly(propylene glycol), 1,3-propanediol, 1,8-octanediol, diethylene glycol monomethyl ether, ethylene glycol monobutyl ether, or dipropylene glycol monomethyl ether.

13. The method of claim 10, wherein the tight gas formation has at least one first gas permeability prior to contacting the formation with the composition and at least one second gas permeability after contacting the formation with the composition, and wherein the second gas permeability is at least 5 percent higher than the first gas permeability.

14. The method of claim 13, wherein the first gas permeability and the second gas permeability are gas relative permeabilities.

15. The method of claim 10, wherein the tight gas formation has been fractured.

16. The method of claim 10, wherein the solvent comprises at least one monohydroxy alcohol, ether, or ketone having independently from 1 to 4 carbon atoms.

17. The method of claim 10, wherein the poly(alkyleneoxy) segment comprises at least one divalent unit represented by formula:

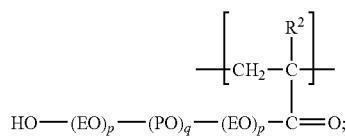

-continued

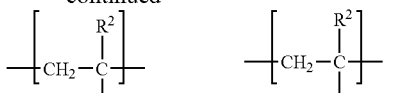

wherein
$R_1$ and $R_2$ are each independently hydrogen or alkyl of 1 to 4 carbon atoms;
EO represents —CH$_2$CH$_2$O—;
each PO independently represents —CH(CH$_3$)CH$_2$O— or —CH$_2$CH(CH$_3$)O—;
each p is independently from 1 to about 128; and
each q is independently from 0 to about 55.

18. A method of reconditioning an at least partially water-blocked hydrocarbon-bearing formation treated with a first wettability modifier, wherein the first wettability modifier comprises a nonionic fluorinated polymer, comprising:
at least one divalent unit represented by formula:

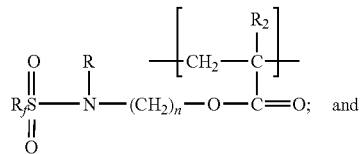

a poly(alkyleneoxy) segment;
wherein
$R_f$ represents a perfluoroalkyl group having from 1 to 8 carbon atoms;
R and $R_2$ are each independently hydrogen or alkyl of 1 to 4 carbon atoms; and
n is an integer from 2 to 10,
the method comprising:
contacting the hydrocarbon-bearing formation with a fluid that does not include the nonionic fluorinated polymer, wherein the fluid at least partially displaces or solubilizes the water in the formation.

19. The method of claim 18, further comprising:
re-treating the hydrocarbon-bearing clastic formation with a composition comprising solvent and a second wettability modifier, wherein the second wettability modifier comprises a nonionic fluorinated polymeric surfactant, comprising:
at least one divalent unit represented by formula:

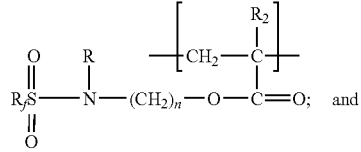

a poly(alkyleneoxy) segment;
wherein
$R_f$ represents a perfluoroalkyl group having from 1 to 8 carbon atoms;
R and $R_2$ are each independently hydrogen or alkyl of 1 to 4 carbon atoms; and
n is an integer from 2 to 10.

20. The method of claim 18, further comprising obtaining performance information from the hydrocarbon-bearing clastic formation after contacting the hydrocarbon-bearing clastic formation with the fluid, wherein the performance information is used to determine whether to re-treat the hydrocarbon-bearing clastic formation with a second wettability modifier.

* * * * *